United States Patent [19]

Weldon

[11] Patent Number: 4,841,185
[45] Date of Patent: Jun. 20, 1989

[54] RISING FREQUENCY GENERATOR

[75] Inventor: William F. Weldon, Austin, Tex.

[73] Assignee: Board of Regents, The University of Texas System, Austin, Tex.

[21] Appl. No.: 36,541

[22] Filed: Apr. 9, 1987

[51] Int. Cl.$^4$ ............................................. H02K 23/60
[52] U.S. Cl. ...................................... 310/115; 310/93
[58] Field of Search ............... 42/84; 89/6.5, 8, 28.05, 89/135; 310/113, 115, 93, 198

[56] References Cited

U.S. PATENT DOCUMENTS

| | | | |
|---|---|---|---|
| 506,169 | 10/1893 | Esmond | 310/115 |
| 771,802 | 10/1904 | Beam et al. | 310/115 |
| 791,929 | 6/1905 | Morrison | 310/115 |
| 1,384,769 | 7/1921 | MacLaren | 89/8 |

FOREIGN PATENT DOCUMENTS 2810645 9/1979 Fed. Rep. of Germany ...... 310/115

OTHER PUBLICATIONS

"How it Works", The Illustrated Science and Invention Encyclopedia, 1977, pp. 851-856, Electric Motor.

Primary Examiner—Stephen C. Bentley
Attorney, Agent, or Firm—Arnold, White & Durkee

[57] ABSTRACT

An alternating current generator has a rotor and a rotatable stator. The moment of inertia of the stator is at least eight times that of the rotor. The electrical output is taken off the windings of the stator or the rotor. In operation, any available mechanical means is used to start the rotor and the stator rotating. The stator is rotated not susbtantially faster than ten percent faster than the rotor. An alternator having its rotor affixed to the same shaft to which the generator's rotor is affixed, is used to brake the rotation of the shaft, and thus the rotors. As the rotors decrease in speed, the electrical output of the generator increases in frequency and voltage.

1 Claim, 3 Drawing Sheets

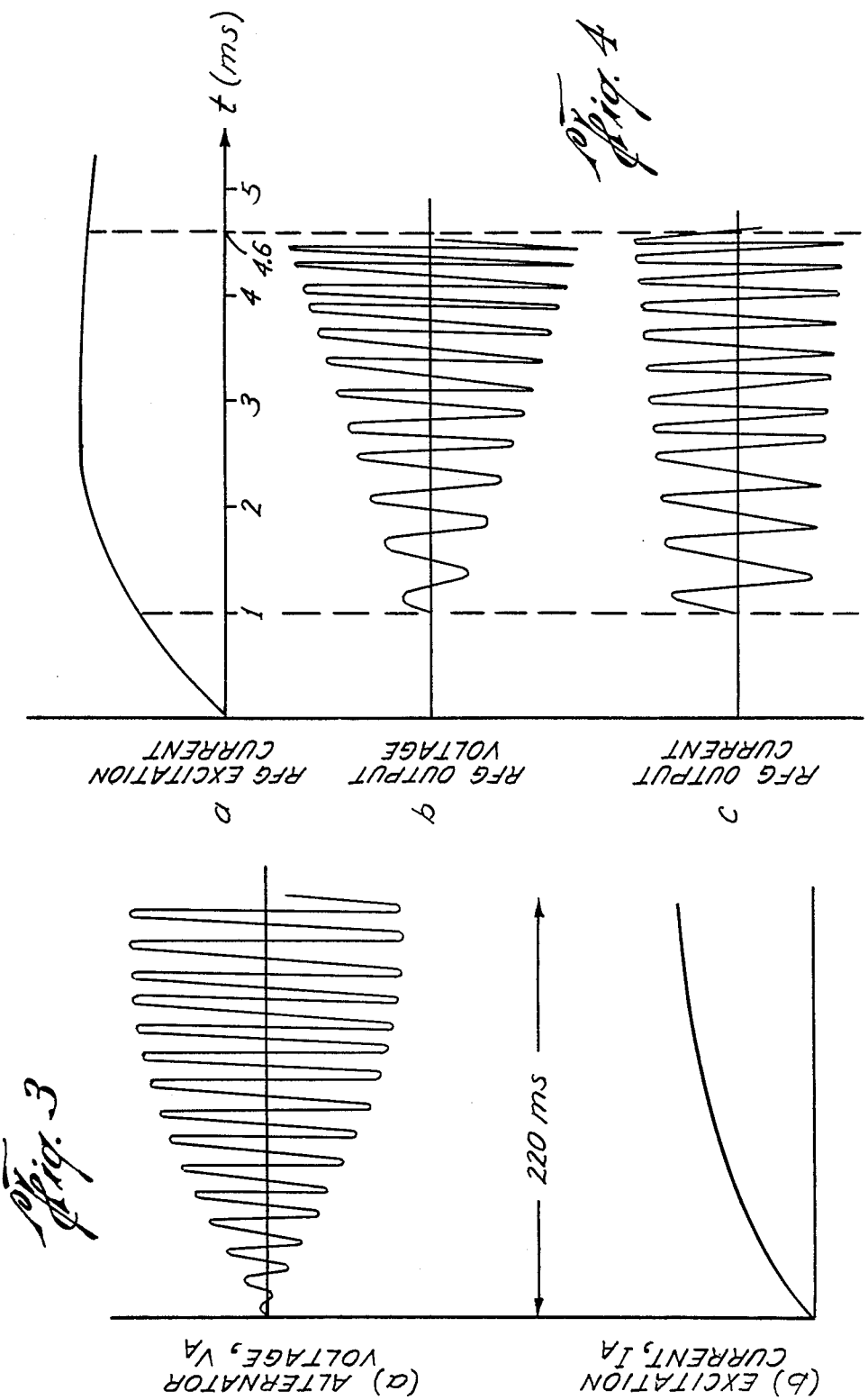

RISING FREQUENCY GENERATOR

BACKGROUND AND SUMMARY OF THE INVENTION

This invention relates to alternating current generators, and in particular to alternating current generators for which the frequency of their output can be changed or varied.

Electromagnetic accelerators can launch projectiles such as bullets or rockets without using explosives or fuels with those projectiles. The two basic electromagnetic accelerators are the rail gun and the coaxial accelerator. The development of coaxial accelerators has been slow, because the coaxial accelerators require an alternating current power supply whose frequency and voltage both rise as the power supply supplies energy to the accelerator.

Furthermore, since applications of coaxial accelerators vary, the need exists for an alternating current power supply which can be modified to match the requirements of a variety of coaxial accelerators.

Applicant overcomes the above-noted and other drawbacks of the prior art by providing a method and apparatus for a rising frequency generator which features the capability of increasing both the voltage and the frequency as it is supplying power. This invention eliminates the undesirable feature common to existing devices wherein either the voltage or frequency remains constant, or only a discrete number of frequencies and voltage levels are available as values to be chosen by the user of the generator. Applicant believes the invention to be the first rising frequency generator which can achieve the generation of large amounts of energy, during which generation both the frequency and voltage of that energy increase.

The above-noted and other aspects of the present invention will become more apparent from a description of the preferred embodiment when read in conjunction with the drawings.

BRIEF DESCRIPTION OF THE DRAWINGS

The invention will further be described by reference to the accompanying drawings which illustrate particular embodiments of a rising frequency generator in accordance with the present invention, wherein like members bear like reference numerals and wherein:

FIG. 1 depicts the mechanical layout of a generator built in accordance with the present invention wherein: FIG. 1A is a side view depicting the shaft, rotor, and stator of the generator; FIG. 1B is a front view depicting the generator of FIG. 1A and an alternator having a rotor and a stator and sharing the same shaft with the generator; and FIG. 1C is a side view depicting the rotor and stator of the alternator and the shaft common to both the alternator and the generator;

FIG. 3(a) is a graph illustrating the rising voltage output of the alternator of FIGS. 1 and 2;

FIG. 3(b) is a graph illustrating the excitation current of the alternator of FIGS. 1 and 2;

FIG. 4(a) is a graph illustrating the excitation current of the generator of FIGS. 1 and 2;

FIG. 4(b) is a graph illustrating the output voltage of the generator of FIGS. 1 and 2; and FIG. 4(c) is a graph illustrating the output current of the generator of FIGS. 1 and 2.

DESCRIPTION OF THE PREFERRED EMBODIMENT

Figure 1:
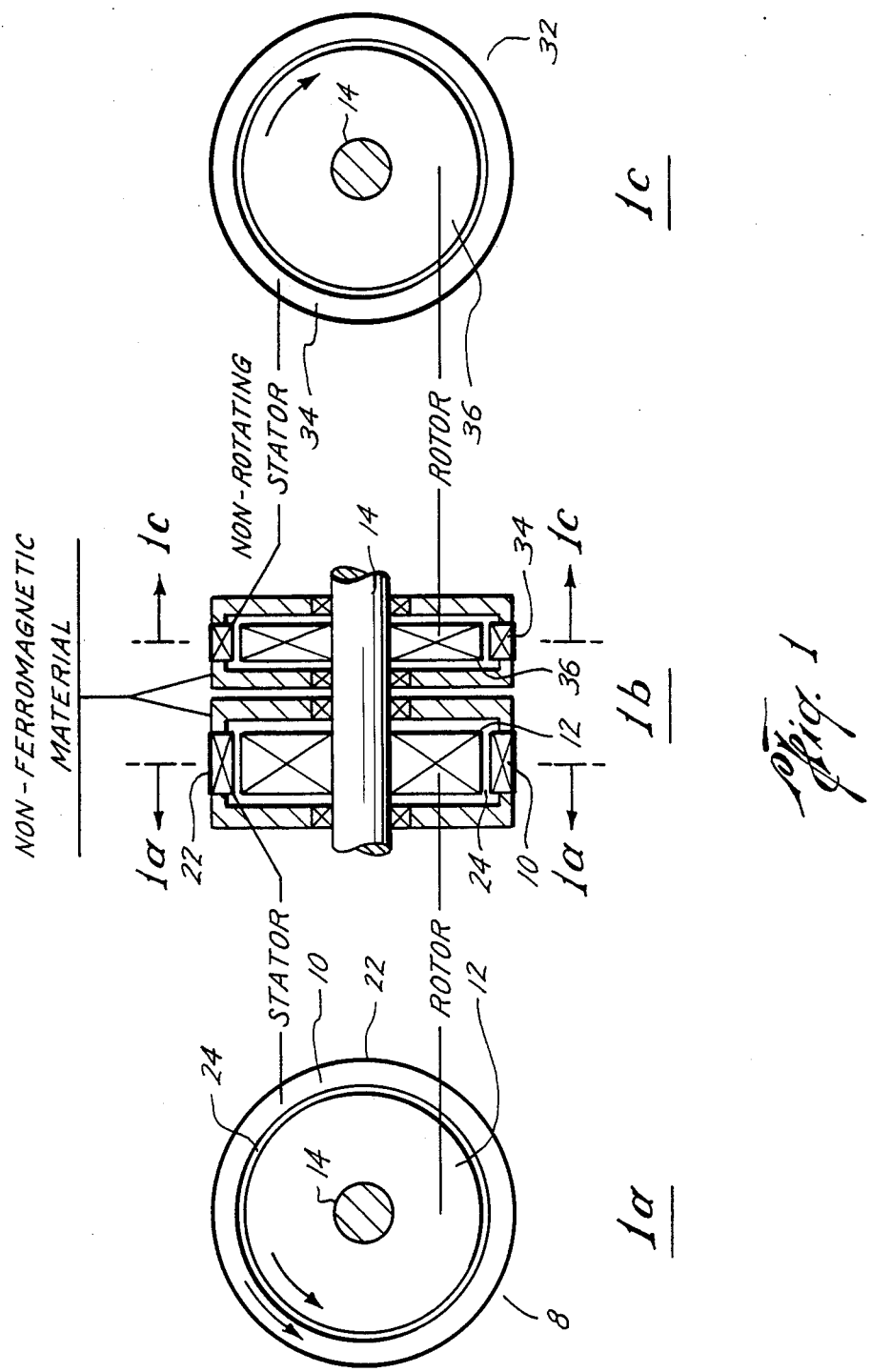
Figure 2:
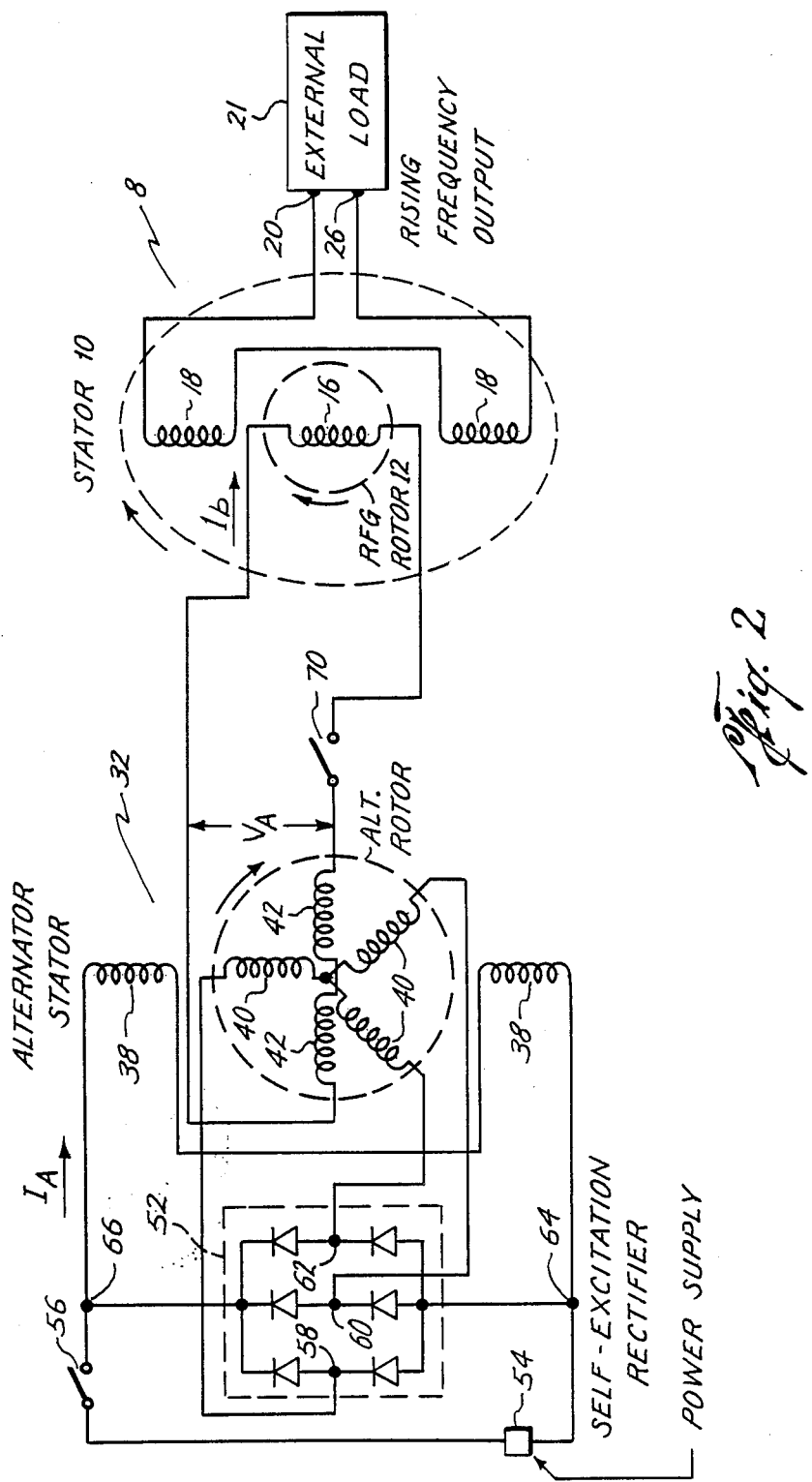
FIG. 2 depicts the electrical layout of the generator and alternator of FIG. 1.

Referring now to the drawings, and particularly to FIG. 1A and FIG. 2, a generator 8 built according to the present invention comprises a rotatable stator 10, a rotor 12, a shaft 14, rotor windings 16, stator windings 18, an output port 20, and a housing 22. The stator 10 and the rotor 12 are separated by an air gap 24.

The stator 10 has a diameter of two meters and the rotor 12 has a diameter of one and six-tenths meters. The stator 10 and the rotor 12 are each four-tenths of a meter thick. The stator has a moment of inertia approximately ten times the moment of inertia of the rotor 12. Both the stator 10 and the rotor 12 have an "active length" of four-tenths meter. The "active length" can be varied depending on the application. Also, the stator and rotor can be any sizes, as long as the moment of inertia of the stator is at least eight times greater than the moment of inertia of the rotor.

The rotor 12 is rigidly attached to the shaft 14. The housing 22 supports the stator 10 by bearings (not shown). The load capacity and stiffness of the bearings must be substantially independent of the speed of rotation of the stator. Therefore, the bearings can not be hydrodynamic bearings, but rather must be either rolling element bearings or hydrostatic bearings. The stator 10 and rotor 12 are positioned to lie in substantially the same plane.

In operation, any available source of mechanical power is used to start the stator 10 and the shaft 14 spinning. The stator 10 and the rotor 12, which is rigidly connected to the shaft 14, may be given the same angular velocity, or the stator 10 may be rotated faster than the rotor 16. However, in the preferred embodiment, the stator is rotated not substantially faster than ten percent faster than the rotor. The output 20 is then conductively coupled to an external load 21 such as a coaxial accelerator (not shown). The frequency and voltage of the output signal 26 is directly proportional to the difference in the angular speeds of rotation of the stator 10 and rotor 12.

As stated earlier, the stator 10 is initially rotating ten percent faster than the rotor 12. However, as soon as the external load is applied to the output port 20, the angular velocity of the rotor 12 begins diminishing more rapidly than the angular velocity of the stator 10. Thus, the differential angular velocity between the rotor and the stator increases, increasing the frequency and voltage of the output signal 26, as shown in FIGS. 4b and 4c.

On an instantaneous basis, the electrical power of the output signal 26 is equal to the mechanical power extracted from the generator 8. The mechanical power extracted from the system is a torque which appears as an equal torque in opposite directions on the rotor and stator, times the differential angular velocity, as in any other generator. Since the moment of inertia of the stator 10 is at least eight times greater than the moment of inertia of the rotor 12, the rotor 12 is affected more by the torque than is the stator, and thus the rotor 12 begins slowing down faster than the stator 10.

The rate at which the differential angular velocity increases may be increased by braking the rotor 12. This may be done by applying any mechanical means for braking to the shaft 14, or it may be done by using an alternator as shown in FIGS. 1 and 2.

Referring now to FIGS. 1 and 2, an alternator 32 is illustrated as a means for braking the shaft 14. The alternator 32 may be any conventional type. The alternator 32 comprises a stator 34, a rotor 36, stator windings 38, three-phase rotor windings 40, and two-phase rotor windings 42. The alternator rotor 36 is firmly attached to the shaft 14, which as discussed earlier, is also the shaft for the generator rotor 12. The stator 34 and the rotor 36 are each two-tenths of a meter thick, but any conventional alternator will serve equally well.

A self-excitation rectifier 50 is conductively coupled to the alternator stator windings 38, and to the alternator three-phase rotor windings 40. The self-excitation rectifier 50 includes a three-phase rectifier 52, a power supply 54, and a switch 56. The three-phase rectifier 52 has three input nodes 58, 60, and 62, and two output nodes, 64 and 66. The input nodes 58, 60, and 62 are connected to the three-phase rotor windings 40, and the output nodes 64 and 66 are connected to the stator windings 38.

In operation, when the operator of the generator 8 desires to brake the rotation of the rotor 12, the operator closes a switch 56 of the alternator. The power supply 54 generates a small current $I_A$ which passes through the stator windings 38. The operator only closes the switch 56 momentarily before opening it again. Of course, the alternator rotor 36 is rotating at the same speed as the generator rotor 12, since they are both fixed to the same shaft 14. Thus, the rotation of the alternator rotor 36 generates a current in the three-phase alternator rotor windings 40 which is rectified by the three-phase rectifier 52 and then passes through the stator windings 38.

Referring now to FIG. 3, for one application, after approximately 220 milliseconds, the excitation current $I_A$ substantially reached its steady state value. Anytime after substantially reaching a steady state value, a switch 70 is closed, thus connecting the alternator two-phase rotor windings 42 with the generator rotor windings 16. Since the alternator rotor 36 and the generator rotor 12 are both connected to the same shaft, no sliding contacts are needed for the connection between the two-phase alternator rotor windings 42 and the generator rotor windings 16. Rather, these two windings can be hard-wired together with the switch 70 inserted in the connection between the two windings. The switch 70 may be any type of switch capable of being activated while rotating. Referring now to FIG. 4a, as soon as the switch 70 is closed, an excitation current $I_B$ flowing between the alternator two-phase rotor windings 42 and the generator rotor windings 16 creates a torque which opposes the rotation of the generator rotor 12, thus braking the rotation of the shaft 14 and its associated rotors 12 and 36.

The principles, preferred embodiments and modes of operation of the present invention have been described in the foregoing specification. The invention is not to be construed as limited to the particular forms disclosed, since these are regarded as illustrative rather than restrictive. Moreover, variations and changes may be made by those skilled in the art without departing from the spirit of the invention.

What is claimed is:

1. An alternating current generator whose power output increases in voltage and frequency as power is delivered to an external load, the generator comprising:
    a shaft;
    a stator having windings, the stator positioned for rotating about the shaft;
    a rotor having windings, the rotor being rigidly connected to the shaft and positioned for rotating with the shaft, the moment of inertia of the rotor being at least eight times less than the moment of inertia of the stator;
    an output port conductively coupled to the windings of the stator; and
    means for breaking the shaft including alternator means for providing excitation current for the generator, said alternator means having a rotor rigidly secured to the shaft.

* * * * *

UNITED STATES PATENT AND TRADEMARK OFFICE
CERTIFICATE OF CORRECTION

PATENT NO. : 4,841,185

DATED : June 20, 1989

INVENTOR(S) : William F. Weldon

It is certified that error appears in the above—identified patent and that said Letters Patent is hereby corrected as shown below:

Column 1, line 6, insert the following new paragraph --The U.S. Government may have rights in this invention pursuant to Grant No. NAG 1-172 from the National Aeronautics and Space Administration.--

Signed and Sealed this

Twenty-first Day of May, 1991

Attest:

HARRY F. MANBECK, JR.

Attesting Officer  Commissioner of Patents and Trademarks